United States Patent
Pelley et al.

(10) Patent No.: US 9,236,795 B2
(45) Date of Patent: Jan. 12, 2016

(54) VOLTAGE GENERATOR WITH RAMP RATE CONTROL

(71) Applicants: Perry H. Pelley, Austin, TX (US); Michael G. Neaves, Austin, TX (US)

(72) Inventors: Perry H. Pelley, Austin, TX (US); Michael G. Neaves, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 39 days.

(21) Appl. No.: 14/182,702

(22) Filed: Feb. 18, 2014

(65) Prior Publication Data

US 2015/0236584 A1 Aug. 20, 2015

(51) Int. Cl.
*G05F 1/10* (2006.01)
*H02M 3/07* (2006.01)

(52) U.S. Cl.
CPC ........................................ *H02M 3/07* (2013.01)

(58) Field of Classification Search
CPC ................................ H02M 3/07; H02M 3/073
See application file for complete search history.

(56) References Cited

U.S. PATENT DOCUMENTS

| | | | |
|---|---|---|---|
| 4,670,703 A | 6/1987 | Williams | |
| 5,258,662 A * | 11/1993 | Skovmand | 327/544 |
| 5,726,944 A | 3/1998 | Pelley et al. | |
| 6,531,902 B1 * | 3/2003 | Tennen et al. | 327/108 |
| 6,642,774 B1 * | 11/2003 | Li | 327/536 |
| 6,836,176 B2 * | 12/2004 | Zeng et al. | 327/535 |
| 6,891,764 B2 * | 5/2005 | Li | 365/189.15 |
| 6,903,599 B2 * | 6/2005 | Chen et al. | 327/536 |
| 7,253,676 B2 * | 8/2007 | Fukuda et al. | 327/536 |
| 7,279,959 B1 | 10/2007 | Choy | |
| 7,482,856 B2 * | 1/2009 | Lee | 327/536 |
| 7,724,072 B2 * | 5/2010 | Baek et al. | 327/536 |
| 7,737,765 B2 | 6/2010 | Tran et al. | |
| 7,795,952 B2 | 9/2010 | Lui et al. | |
| 7,859,321 B2 * | 12/2010 | Riedel | 327/536 |
| 7,902,910 B2 * | 3/2011 | Park et al. | 327/536 |
| 8,013,666 B1 | 9/2011 | Liu | |
| 8,098,089 B2 * | 1/2012 | Bitonti et al. | 327/534 |
| 8,120,412 B2 * | 2/2012 | Pelley | 327/536 |
| 8,400,122 B2 | 3/2013 | North et al. | |
| 8,462,578 B2 | 6/2013 | Neto et al. | |

FOREIGN PATENT DOCUMENTS

EP 2555076 A2 2/2013

* cited by examiner

*Primary Examiner* — Jeffrey Zweizig

(57) ABSTRACT

A charge pump system includes a comparator having a first input coupled to a first reference voltage, a second input coupled to a feedback signal and an output coupled to control operation of a voltage controlled oscillator. The feedback signal is coupled to an output of the charge pump system. An amplifier has a first input coupled to a second reference voltage, a second input coupled to the feedback signal, and an output coupled as input to the voltage controlled oscillator. A gain of the amplifier is lower than a gain of the comparator.

20 Claims, 2 Drawing Sheets

VOLTAGE GENERATOR WITH RAMP RATE CONTROL

BACKGROUND

1. Field

This disclosure relates generally to voltage generators, and more particularly to voltage generators with ramp rate control.

2. Related Art

Voltage generators are used for a variety of purposes in semiconductor devices. Often these voltage generators are only used during portions of the operation of the semiconductor device. One example is non-volatile memories that require high voltages for program and erase operations. In this type of application it is beneficial to have the voltage generator provide the desired voltage quickly. It is also useful to have control over the supplied voltage that is to be used and for the supplied voltage to not introduce noise into the system. Thus, low ripple, which is difficult in generated voltages, is beneficial. These considerations are also relevant in nearly all voltage generators.

Accordingly there is a need to provide further improvement in achieving a voltage generator that quickly provides the desired voltage while avoiding high ripple.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a voltage generator provides a desired voltage by having a high ramp rate for a first portion and a variable ramp rate until the desired voltage is reached. An amplifier is first operated as a comparator during the first portion and an amplifier with a lower gain than a comparator in achieving the variable rate. This is better understood by reference to the drawings and the following written description.

Figure 1:
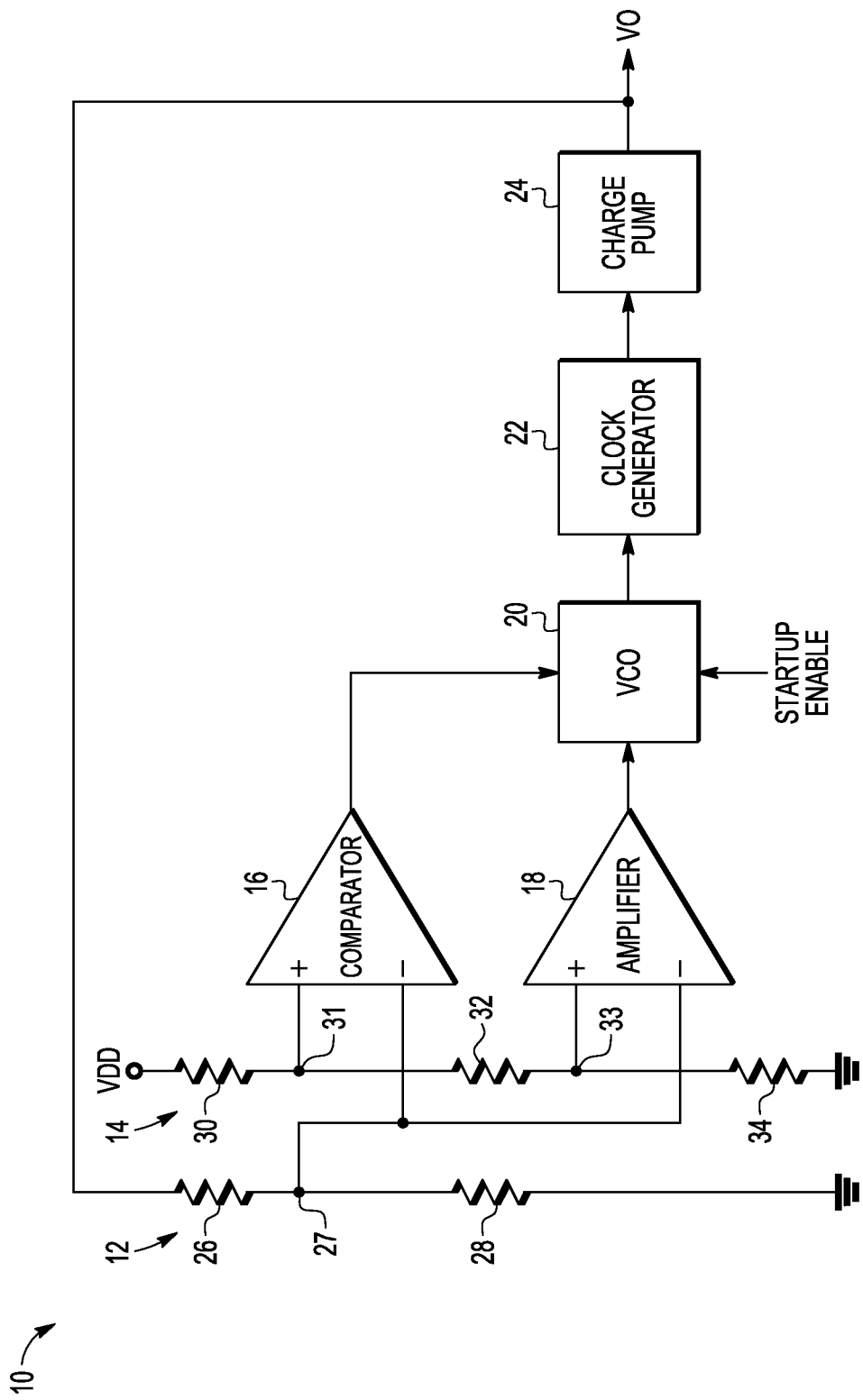
FIG. 1 is a combination block diagram and circuit diagram of a voltage generator with ramp control.

Shown in FIG. 1 is a voltage generator 10 including a voltage divider 12 connected between an output of voltage generator 10 and a negative power supply terminal that may be referenced as ground, a voltage divider 14 connected between ground and a positive power supply terminal that may be referenced as VDD, a comparator 16, an amplifier 18, a voltage controlled oscillator (VCO) 20, a clock generator 22, and a charge pump 24. Voltage divider 12 includes a resistor 26 and a resistor 28. Resistor 26 has a first terminal connected to the output of voltage generator 10 and a second terminal. Resistor 28 has a first terminal connected to the second terminal of resistor 26 and a second terminal connected to ground. Voltage divider 14 comprises resistors 30, 32, and 34. Resistor 30 has a first terminal connected to VDD and a second terminal. Resistor 32 has a first terminal connected to the second terminal of resistor 30 and a second terminal. Resistor 34 has a first terminal connected to the second terminal of resistor 32 and a second terminal connected to ground. Comparator 16 has a non-inverting input connected to the second terminal of resistor 30 and the first terminal of resistor 32, an inverting input connected to the second terminal of resistor 26 and to the first terminal of resistor 28, and an output. The connection at the second terminal of resistor 26 and the first terminal of resistor 28 is a feedback node 27. The connection at the second terminal of resistor 30 and the first terminal of resistor 32 is a reference node 31. Amplifier 18, which is a differential amplifier, has an inverting input connected to feedback node 27, a non-inverting input connected to the second terminal of resistor 32 and the first terminal of resistor 34, and an output. The connection between the second terminal of resistor 32 and the first terminal of resistor 34 is a reference node 33. VCO 20 has a frequency control input coupled to the output of amplifier 18, an on/off control input coupled to the output of comparator 16, a startup enable input, and an output. Clock generator 22 has an input connected to the output of VCO 20 and an output which may be a plurality of outputs. Charge pump 24 has an input coupled to receive the output or outputs of clock generator 22 and an output that provides an output VO coupled to the first terminal of resistor 26. Output VO is the output of voltage generator 10 and would be coupled to other circuitry. Voltage generator 10 may be formed in a semiconductor device and may be referenced as a charge pump system.

Initially output VO is at ground and VCO 20 is gated off by negating the startup enable input. When VCO 20 is enabled, by gating on the startup enable signal, VCO 20 begins oscillating and charge pumping begins. Comparator 16 compares the voltages at nodes 31 and 27. Node 31 is at a voltage based on the resistances of resistors 30, 32, and 34 and the voltage differential between VDD and ground. The voltage at node 33 will also be based on the resistances of resistors 30, 32, and 34 and the voltage differential between VDD and ground. In this configuration of voltage divider 14, node 33 will have a lower voltage than node 31. Because output VO is at ground, node 27 is at ground and comparator 16 will provide a logic high to VCO 20 thus enabling VCO to provide an output to clock generator 22. The frequency of the output of VCO 20 is determined by the voltage output of amplifier 18. The voltage output of amplifier 18 is determined by the voltage differential between nodes 27 and 33. With node 27 at ground, amplifier 18 provides a voltage at its maximum output which in turn will cause VCO 20 to provide a frequency at the maximum frequency that will be provided in operation of voltage generator 10 in this described example that assumes, for example, a constant temperature and a constant voltage level for VDD. Clock generator 22 responds to this highest frequency with clocks that correspond to the frequency to charge pump 24. Charge pump 24 responds by generating a voltage provided as output VO increasing at the fastest rate. With output VO increasing in magnitude, node 27 increases. Amplifier 18 is designed to maintain the same maximum voltage level at its output until node 27 increases to a predetermined level. This operation of amplifier 18 in which its output stays the same although the input differential is narrowing may be called saturation. Thus as long as amplifier 18 remains in saturation, VCO 20, clock generator 22, and charge pump 24 continue functioning at the same frequency and thus substantially the same rate of increase of output voltage until node 27 reaches a sufficiently high voltage to bring amplifier 18 out of saturation.

Figure 2:
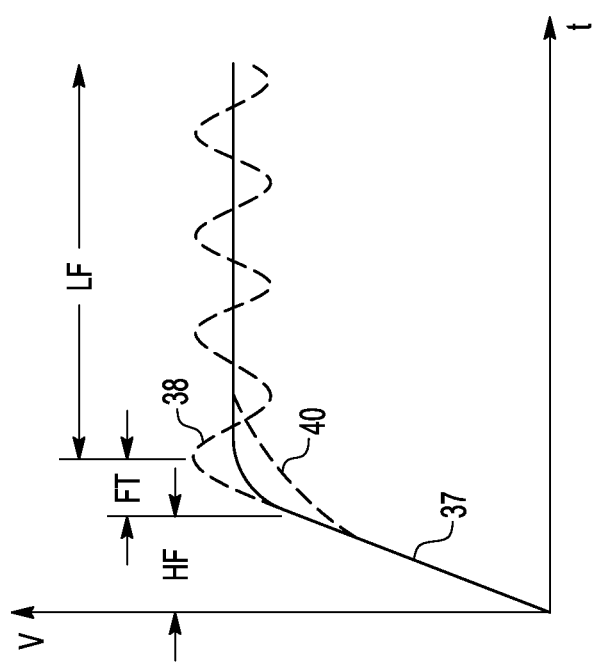
FIG. 2 is a timing diagram helpful in understanding the operation of the voltage generator of FIG. 1 as compared to two prior examples.

The beginning of the coming out of saturation of amplifier 18 is shown in FIG. 2 at a transition between high frequency HF and frequency transition FT. The voltage of output VO increases at a first rate, which is achieved with the high frequency HF of VCO 20, then, during the frequency transition FT, transitions to a final voltage level that is maintained with a low frequency LF of VCO 20. When the transition begins with node 27 reaching a sufficiently high voltage to bring amplifier 18 out of saturation and into an amplification region of operation, amplifier 18 begins providing a lower voltage to VCO 20 which in turn provides a lower frequency to clock generator 22 which in turn provides a lower frequency to charge pump 24. As the frequency input to charge pump 24, decreases, output VO increases at a lower rate. When node 27 is at the same voltage as node 33, amplifier 18 is providing its common mode output. A convenient choice for the output of amplifier 18 at the common node point is ½ VDD but in some embodiments other choices may be better. The output at this condition is designed to be optimum for the particular conditions with may include a variety of factors including threshold voltage of the transistors, power supply voltage level, and desired linear range. As node 27 continues above node 33, the output of amplifier 18 continues to decrease thus continuing to decrease the rate of increase of output VO until the voltage at node 27 exceeds the voltage at node 31 in which case comparator 16 outputs a logic low to VCO 20. VCO 20 responds by stopping its clock output so that clock generator 22 stops generating clocks and charge pump 24 stops increasing output VO. The delay from the on-off input to the VCO 20 through the Clock generator 22 may cause the output VO of charge pump 24 VO to continue to increase for a short time after comparator 16 switches causing the voltage at node 27 to increase by a small amount above node 31.

Once comparator 16 switches VCO 20 off, voltage generator 10 tries to maintain output VO at a constant voltage level. With charge pump 24 not pumping, output VO declines until node 27 drops below node 31 at which time comparator 16 will enable VCO 20. The delay from the on-off input to the VCO 20 through the Clock generator 22 may cause the output of Charge pump 20 VO to continue to decrease for a short time after comparator 16 switches causing the voltage at node 27 to decrease by a small amount below node 31. Thus output VO of charge pump 24, controlled by the voltage on node 27 and 31 and thereby comparator 16 switching VCO 20, clock generator 22 and charge pump 24 on and off, continues to seek the desired voltage, sometimes being slightly above and sometimes slightly below that desired voltage. This overshooting and undershooting of the desired voltage is called ripple.

Comparator 16, as is typical of comparators, may be considered to have a gain that exists in the transition that exists between logic states. This gain is significantly higher, at least an order of magnitude, than the gain of amplifier 18 in its amplification region of operation. It may be beneficial to have an even greater difference such as the gain of the comparator being more than three orders of magnitude greater than the gain of the amplifier in its amplification region. In this case, amplifier 18 and comparator 16 share the same feedback voltage based on output VO but they could use different ratios of output voltage VO as the feedback voltage. It is beneficial for the voltage of output VO at which comparator 16 switches to be a voltage in which amplifier 18 is in its linear amplification region of operation.

Shown in FIG. 2 is a curve 38 and a curve 40 that show prior art results, in dotted lines, for an output voltage of a voltage generator using a charge pump. Curve 38 shows using a single frequency for the charge pump in generating an output voltage. This is fast in reaching the desired voltage and results in high ripple. High ripple is an undesirable source of noise and may cause transistor reliability issues. Curve 40 shows a step transition from a high frequency to a single slower frequency which avoids the high ripple but is slow in reaching the desired voltage. Curve 37 shows the results of voltage generator 10 of FIG. 1 in which the desired voltage is reached nearly as quickly as curve 38 but with much lower ripple and is much faster than curve 40 in reaching the desired voltage. Curve 37 begins with a high frequency region HF which is used to rapidly raise the output. There is then a frequency transition region FT in which the frequency decreases from the initial high frequency. The final voltage is reached at a low frequency and that low frequency is then maintained in the low frequency region LF. In low frequency region LF, the ripple is significantly lower than if the initial high frequency had been maintained. Utilizing frequency transition region FT results in attaining the desired voltage quickly and maintaining it with low ripple.

By now it should be appreciated that there has been provided a semiconductor device having a charge pump system. The charge pump system includes a comparator having a first input coupled to a first reference voltage, a second input coupled to a feedback signal and an output coupled to control operation of a voltage controlled oscillator, wherein the feedback signal is coupled to an output of the charge pump system. The charge pump system further includes an amplifier having a first input coupled to a second reference voltage, a second input coupled to the feedback signal, and an output coupled as input to the voltage controlled oscillator, wherein a gain of the amplifier is lower than a gain of the comparator. The semiconductor device may further include a first voltage divider including an input terminal coupled to a supply voltage, a first resistive element and a second resistive element, the first reference voltage is tapped between the supply voltage and the first resistive element, and the second reference voltage is tapped between the first resistive element and the second resistive element. The semiconductor device may have a further characterization by which the first reference voltage is greater than the second reference voltage. The semiconductor device may further include a second voltage divider including an input terminal coupled to the output of the charge pump system, a first resistive element, and a second resistive element, wherein the feedback signal is tapped off the second voltage divider between the first resistive element and the second resistive element. The semiconductor device may further include a clock generator including an input coupled to an output of the voltage controlled oscillator, the clock generator outputs a clock signal based on the output of the voltage controlled oscillator. The semiconductor device may further include a charge pump coupled to receive the clock signal and to generate the output of the charge pump system. The semiconductor device may have a further characterization by which the gain of the amplifier is more than an order of magnitude less than the gain of the comparator. The semiconductor device may have a further characterization by which the first input of the comparator is a non-inverting input and the second input of the comparator is an inverting input and. The semiconductor device may have a further characterization by which the first input of the amplifier is a non-inverting input and the second input of the amplifier is an inverting input. The semiconductor device may have a further characterization by which the first reference voltage sets a voltage at which the voltage controlled oscillator is turned off, and the second reference voltage sets a beginning of a transition phase from a first frequency to a second frequency for the output of the voltage controlled oscillator. The semiconductor device may have a further characterization by which the first frequency is higher than the second frequency.

Described also is a method of operating a charge pump system. The method includes generating a first control signal using a comparator, wherein the first control signal is based on a difference between a first reference voltage and a charge pump output feedback voltage signal. The method further includes generating a second control signal from an amplifier, wherein the second control signal is based on a result of an amplified difference between a second reference voltage and a charge pump output feedback voltage, wherein the second reference voltage is less than the first reference voltage and a gain factor of the amplifier is less than a gain factor of the comparator. The method further includes generating an oscillator signal based on the first and second control signals in a voltage controlled oscillator. The method may further include generating a clock signal based on the oscillator signal output by the voltage controlled oscillator. The method may further include generating a charge pump output voltage based on the clock signal, wherein during startup of the charge pump system, the charge pump output voltage has a high frequency region, and a frequency transition region that is determined by the second reference voltage, before entering a low frequency region. The method may further include coupling a supply voltage to a first terminal of a first resistive element and using voltage at a second terminal of the first resistive element as the first reference voltage and coupling a first terminal of a second resistive element to a second terminal of the first resistive element and using voltage at a second terminal of the second resistive element as the second reference voltage. The method may further include coupling the charge pump output voltage to a first terminal of a first resistive element and using voltage between the first resistive element and a second resistive as the charge pump output feedback voltage.

Also described is a charge pump system for a semiconductor device. The charge pump system includes a comparator including a first input coupled to a first reference voltage and a second input coupled to a feedback signal. The charge pump system further includes an amplifier including a first input coupled to a second reference voltage and a second input coupled to the feedback signal, wherein a gain of the amplifier is less than a gain of the comparator. The charge pump system further includes a voltage controlled oscillator having a first input coupled to output of the comparator and a second input coupled to output of the amplifier. The semiconductor device may further include a clock generator coupled to receive an oscillator signal from the voltage controlled oscillator and to generate a clock signal. The semiconductor device may further include a charge pump coupled to receive the clock signal and to generate a charge pump output voltage. The semiconductor device may have a further characterization by which the feedback signal is based on the charge pump output voltage. The semiconductor device may have a further characterization by which the second reference voltage is less than the first reference voltage and, during startup of the charge pump system, the charge pump output voltage has a high frequency region, and a frequency transition region that is determined by the second reference voltage.

Although the invention is described herein with reference to specific embodiments, various modifications and changes can be made without departing from the scope of the present invention as set forth in the claims below. A different technique may used in generating reference voltages may be utilized. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A semiconductor device, comprising:
   a charge pump system including:
      a comparator having a first input coupled to a first reference voltage, a second input coupled to a feedback signal and an output coupled to control operation of a voltage controlled oscillator, wherein the feedback signal is coupled to an output of the charge pump system; and
      an amplifier having a first input coupled to a second reference voltage, a second input coupled to the feedback signal, and an output coupled as input to the voltage controlled oscillator, wherein a gain of the amplifier is lower than a gain of the comparator.

2. The semiconductor device of claim 1, further comprising:
   a first voltage divider including an input terminal coupled to a supply voltage, a first resistive element and a second resistive element, the first reference voltage is tapped between the supply voltage and the first resistive element, and the second reference voltage is tapped between the first resistive element and the second resistive element.

3. The semiconductor device of claim 2, wherein the first reference voltage is greater than the second reference voltage.

4. The semiconductor device of claim 1, further comprising:
   a second voltage divider including an input terminal coupled to the output of the charge pump system, a first resistive element, and a second resistive element, wherein the feedback signal is tapped off the second voltage divider between the first resistive element and the second resistive element.

5. The semiconductor device of claim 1, further comprising:
   a clock generator including an input coupled to an output of the voltage controlled oscillator, the clock generator outputs a clock signal based on the output of the voltage controlled oscillator.

6. The semiconductor device of claim 5, further comprising:
   a charge pump coupled to receive the clock signal and to generate the output of the charge pump system.

7. The semiconductor device of claim 1, wherein the gain of the amplifier is more than an order of magnitude less than the gain of the comparator.

8. The semiconductor device of claim 7, wherein
   the first input of the comparator is a non-inverting input and the second input of the comparator is an inverting input, and
   the first input of the amplifier is a non-inverting input and the second input of the amplifier is an inverting input.

9. The semiconductor device of claim 1, wherein the first reference voltage sets a voltage at which the voltage controlled oscillator is turned off, and the second reference voltage sets a beginning of a transition phase from a first frequency to a second frequency for the output of the voltage controlled oscillator.

10. The semiconductor device of claim 9, wherein the first frequency is higher than the second frequency.

11. A method of operating a charge pump system comprising:
- generating a first control signal using a comparator, wherein the first control signal is based on a difference between a first reference voltage and a charge pump output feedback voltage signal;
- generating a second control signal from an amplifier, wherein the second control signal is based on a result of an amplified difference between a second reference voltage and the charge pump output feedback voltage, wherein the second reference voltage is less than the first reference voltage and a gain factor of the amplifier is less than a gain factor of the comparator; and
- generating an oscillator signal based on the first and second control signals in a voltage controlled oscillator.

12. The method of claim 11, further comprising:
generating a clock signal based on the oscillator signal output by the voltage controlled oscillator.

13. The method of claim 12, further comprising:
generating a charge pump output voltage based on the clock signal, wherein during startup of the charge pump system, the charge pump output voltage has a high frequency region, and a frequency transition region that is determined by the second reference voltage, before entering a low frequency region.

14. The method of claim 11, further comprising:
coupling a supply voltage to a first terminal of a first resistive element and using voltage at a second terminal of the first resistive element as the first reference voltage; and
coupling a first terminal of a second resistive element to a second terminal of the first resistive element and using voltage at a second terminal of the second resistive element as the second reference voltage.

15. The method of claim 13, further comprising:
coupling the charge pump output voltage to a first terminal of a first resistive element and using voltage between the first resistive element and a second resistive as the charge pump output feedback voltage.

16. A charge pump system for a semiconductor device comprising:
- a comparator including a first input coupled to a first reference voltage and a second input coupled to a feedback signal;
- an amplifier including a first input coupled to a second reference voltage and a second input coupled to the feedback signal, wherein a gain of the amplifier is less than a gain of the comparator; and
- a voltage controlled oscillator having a first input coupled to output of the comparator and a second input coupled to output of the amplifier.

17. The device of claim 16, further comprising:
a clock generator coupled to receive an oscillator signal from the voltage controlled oscillator and to generate a clock signal.

18. The device of claim 17, further comprising:
A charge pump coupled to receive the clock signal and to generate a charge pump output voltage.

19. The device of claim 18, wherein the feedback signal is based on the charge pump output voltage.

20. The device of claim 16, wherein
the second reference voltage is less than the first reference voltage, and
during startup of the charge pump system, the charge pump output voltage has a high frequency region, and a frequency transition region that is determined by the second reference voltage.

* * * * *